Nov. 25, 1969        W. A. LANKFORD        3,480,747
ANGULARLY ADJUSTABLE IN LINE DISCONNECT ASSEMBLY
AND ADJUSTABLE LINK THEREFOR
Filed March 26, 1968        3 Sheets-Sheet 2
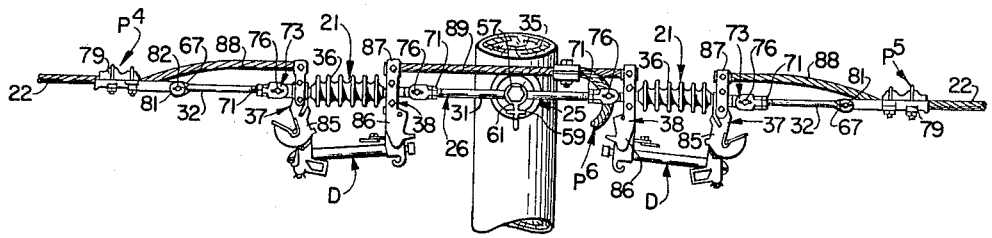
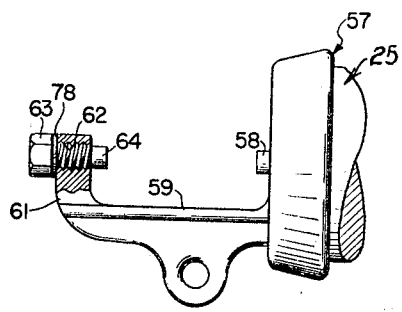
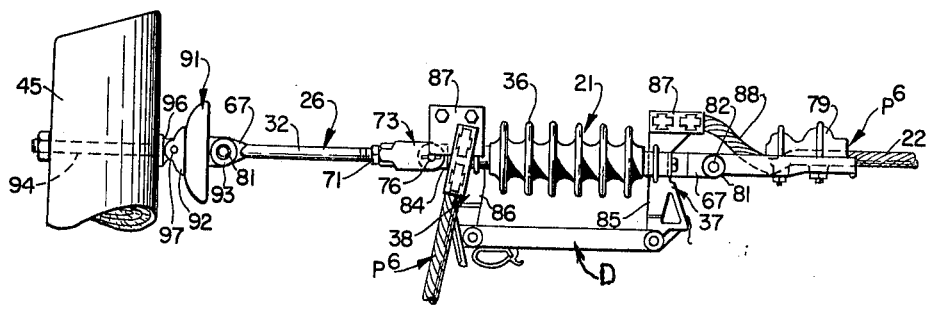
INVENTOR
William Austin Lankford
BY Strauch, Nolan, Neale, Nies & Kurz
ATTORNEYS

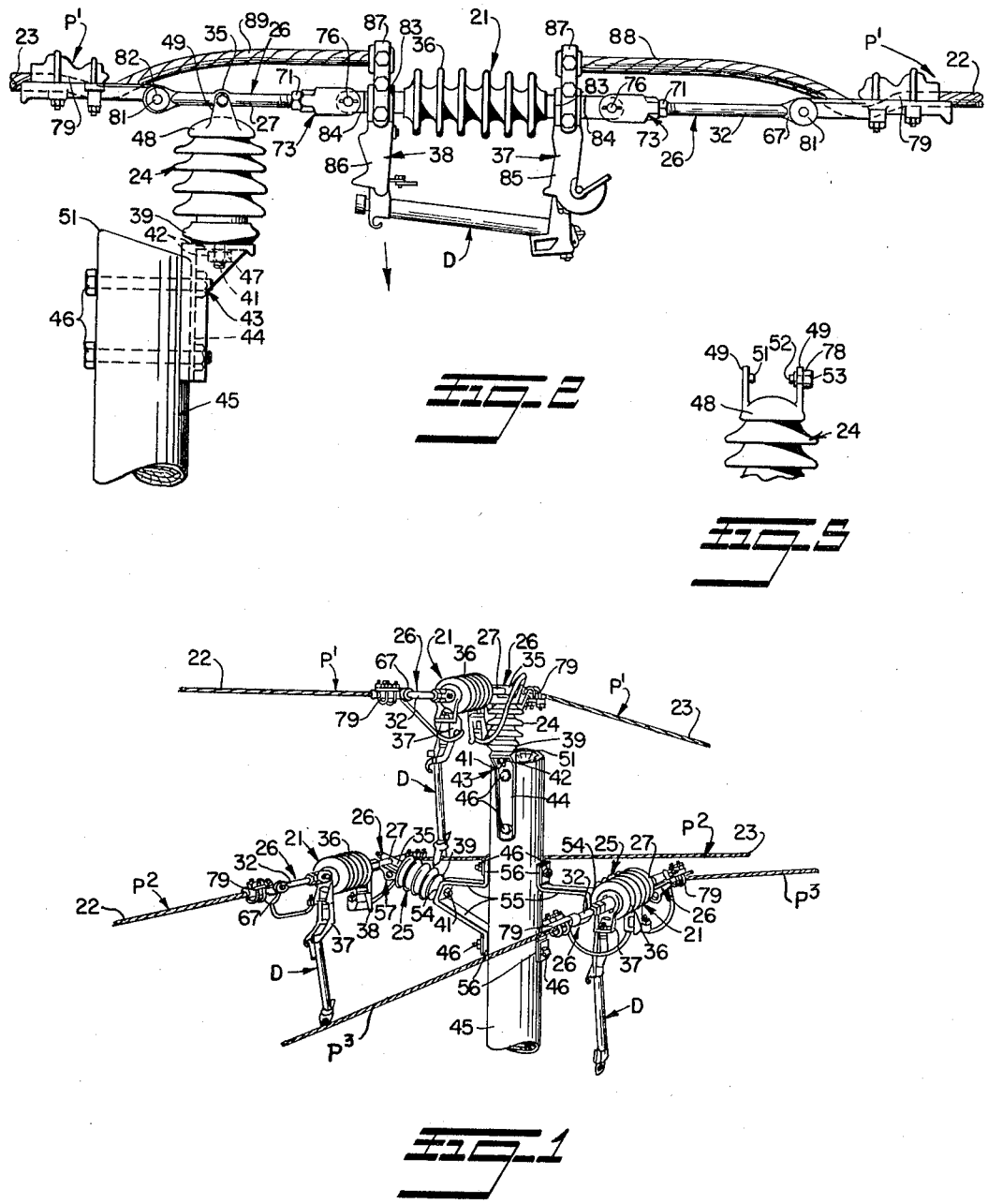

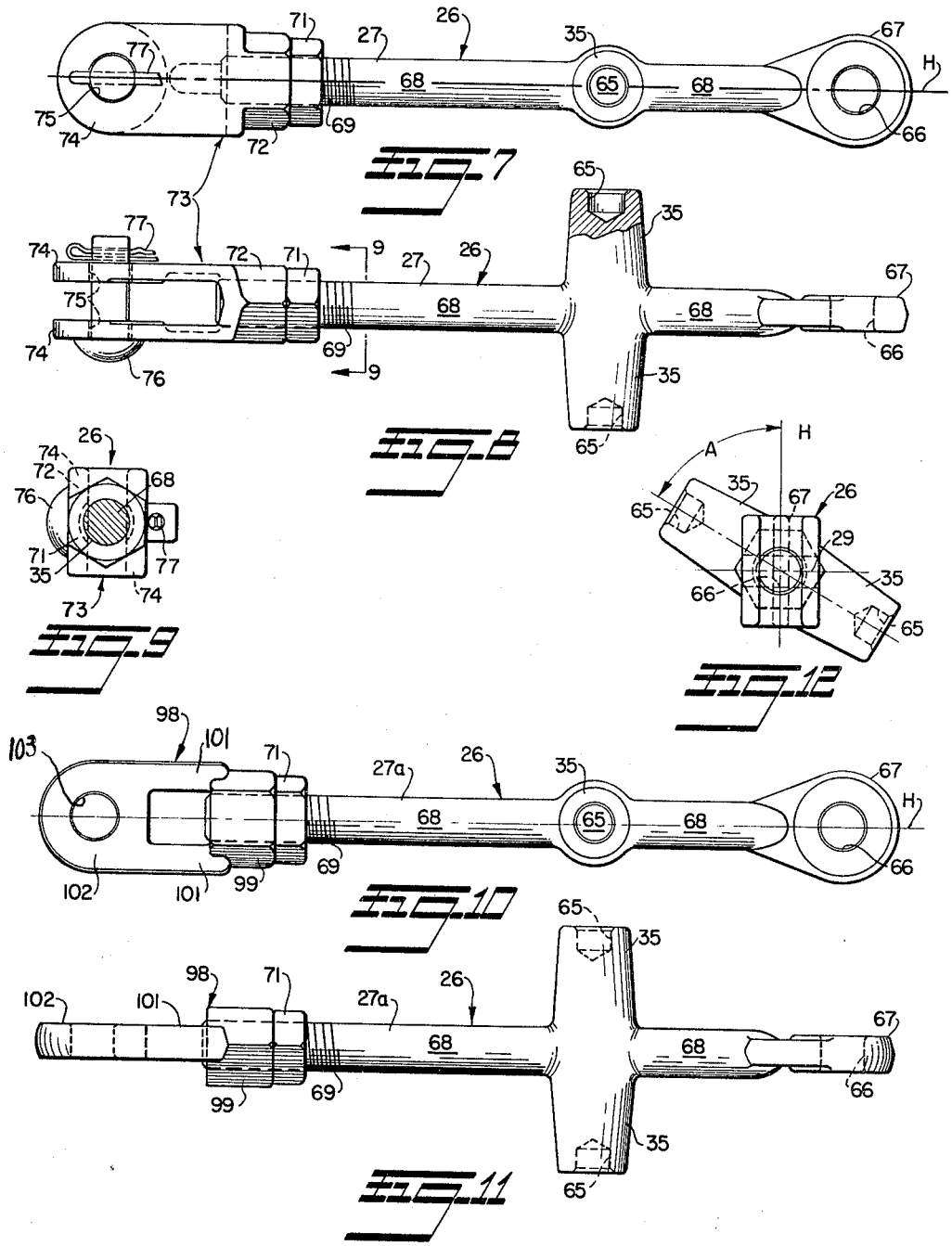

3,480,747
ANGULARLY ADJUSTABLE IN LINE DISCONNECT
ASSEMBLY AND ADJUSTABLE LINK THEREFOR
William Austin Lankford, Birmingham, Ala., assignor to
USCO Power Equipment Corporation, Birmingham,
Ala., a corporation of Alabama
Filed Mar. 26, 1968, Ser. No. 716,085
Int. Cl. H01h 85/36
U.S. Cl. 200—48                                      10 Claims

ABSTRACT OF THE DISCLOSURE

An electrical power line in line strain insulator supported disconnect having an adjustable link connection interposed between an end of the strain insulator and the line post insulator of the opposite ends of the strain insulator and the line post insulator and the conductor line respectively to angularly orient the disconnect around the axis of the conductor line to assure free pivotal movement of the in line strain insulator and its mounted disconnect assembly bodily in a vertical plane irrespective of the angularity of the line post insulator and also to relieve any twist in the conductor line and to orient the disconnect to a preselected plane of operation containing the axis of the conductor line.

BACKGROUND OF INVENTION

In recent years electric power companies and the producers of power line distribution and switching equipment have striven to simplify the lineman's job in stringing overhead power lines by the provision of in line strain insulator mounted disconnect switching stations (switch blade or dropout fuse type) and eliminating the unsightly multi-arm pole top structures previously used. One of the problems incident to this simplification endeavor has been the need to support the switching structure in a manner to confine movement of the switching equipment to a vertical plane irrespective of the angle of the line post insulator to the post carrying the overhead lines and to enable the lineman to relieve the strain insulator supported disconnect assembly from torsional canting forces imposed by twisting of the conductor line so as to orient the disconnect for operation in a preselected, usually vertically dependent, relation to the axis of the conductor line. These two considerations are important to restrain rotation of the switching structure around the axis of the conductor line and to assure free, non-binding opening and closing movement of the disconnect, particularly where the disconnect is of the dropout fuse tube type or a hook stick operated switch operable from beneath the line or from a power bucket on or near the level of the line using either a simple hook stick or a loadbuster equipped hook stick.

Prior efforts to accomplish these stated ends have resulted in the provision of vertical mounted line post insulators having top caps providing a laterally directed, horizontal pivot axis (see FIGURES 2 and 5 of this application) or horizontal or near horizontal mounted line post insulators having top caps providing an axially directed, horizontal pivot axis (see FIGURES 3 and 4 of this application) and providing strain insulator extension links having oppositely directed pivot arms fitted to the pivot pins forming such axes to confine the movement of the switching equipment to a vertical plane as disclosed and claimed in applicant's prior United States Letters Patent 3,300,599 of Jan. 24, 1967 and, further as disclosed in said Letters Patent, providing the strain insulator cap with annularly slotted pivot brackets or pivot brackets having multiple angularly spaced bolt passages therethrough in an effort to effect angular orientation of the strain insulator supported disconnect assembly to as near as possible vertical dependent relation.

While these prior patent proposals have partially met the problems, it has been found in practice that proper confinement of the switching equipment to a vertical plane is not possible, particularly if the line pole insulator is mounted other than in vertical or horizontal position, and that the angular orientation of the strain insulator to position the disconnect to the desired vertically dependent relation is either impossible of achievement or presents such difficulties to the lineman that proper orientation is seldom attempted and rarely effected with the result that proper operation of the disconnect when required is not possible.

SUMMARY OF THE INVENTION

The present invention overcomes the deficiencies of the prior art discussed above by substituting an extension link having (1) a first pivot connection at one end, (2) oppositely directed pivot arms between its ends pre-factory angularly oriented to said first pivot connection to match the angle of the line insulator axis with which it is to be used to assuredly confine movement of the in line strain insulator assembly to a vertical plane, and (3) a second pivot connection threadedly engaged with the other end of the extension link and lockable by a clamp nut, set screw, or similar locking means in any selected angular relation to the longitudinal axis of said extension link to permit ready angular orientation of the strain insulator supported disconnect assembly to the desired vertically dependent relation to the conductor line axis merely by loosening of the lock nut and micrometer-like threading of the second pivot connection relative to the threaded section of the extension link. This structure reduces the installation operations of the lineman necessary to effect a perfect in line disconnect assembly simply to selection of the appropriately angled extension link, release of a single clamp nut to free the threaded second pivot connection for threaded movement to effect precise dependent vertical positioning of the strain insulator supported disconnect assembly and then lock it in final adjusted position.

It, accordingly, is a primary object of the present invention to provide an in line strain insulator mounted disconnect assembly with an extension link having relatively angularly adjustable end pivot connectors for connecting one end of the strain insulator to a line post insulator so that strain insulator and its disconnect switch means may be readily and accurately oriented to dispose the disconnect switch means in dependent vertical planar relation to the common axis of the conductor line and the strain insulator.

A further important object of the present invention is to provide the extension link of the previous object with oppositely directed pivot arms having an annular relation to one of the end pivot connectors matching the angular inclination of the line post insulator thereby adapting the extension link to confine the in line strain insulator mounted disconnect assembly to pivotal movement solely in a vertical plane.

A still further object of the present invention is to provide the extension link of the immediately preceding object with relatively angularly adjustable opposite end pivot connectors adapting the extension link to have a maximum angularly adjustable range sufficient to both relieve any twist in the conductor line and permit orientation of the disconnect switch means to the desired dependent vertical planar relation without counter twisting the conductor line.

BRIEF DESCRIPTION OF THE DRAWINGS

Further objects will appear from the following description and appended claims when read in conjunction with the accompanying drawings wherein:

FIGURE 1 is a perspective view of a typical three phase distribution system provided with in line, vertically planar movable strain insulator supported, disconnects embodying the ready adjustment feature of the present invention;

FIGURE 2 is a side elevational view of a vertically mounted line pole insulator and its connection to an adjustable trunnion link provided by the present invention;

FIGURE 3 is a side elevational view of a horizontally mounted, line post insulator and its connection through a double ended adjustable link of the present invention to establish a multi-source supply to a tap line leading underground;

FIGURE 4 is a side elevational view of a cap structure for a horizontal mounted line post insulator adapted for journalling the adjustable trunnion link of FIGURE 2;

FIGURE 5 is a side elevational view of a cap structure for a vertically mounted line post insulator adapted for journalling the adjustable trunnion link of FIGURE 2;

FIGURE 6 is a side elevational view of an alternate form of adjustable link for use with a horizontal mounted line post insulator to obtain the ready adjustment feature of the present invention where a tap line junction is provided;

FIGURE 7 is a rear side elevational view of one form of adjustable trunnion link provided in accord with this invention;

FIGURES 8 and 9 are respectively a top plan view and transverse sectional view along line 9—9 of the link of FIGURE 7;

FIGURES 10 and 11 are respectively a rear side elevational view and a top plan view of another form of adjustable trunnion link provided in accord with this invention; and FIGURE 12 is a left end view of an adjustable link of the type shown in FIGURE 7 wherein the trunnion cross arms are angularly offset with respect to the fixed pivot end connector of the link to adapt the link for trunnion connection to an inclined mounted line post insulator.

DESCRIPTION OF FIRST EMBODIMENT

With continued reference to the drawings wherein the same reference numeral is used throughout the several views of the drawings to indicate the same part, a respective in line strain insulator mounted disconnect assembly 21 is interposed between and separates the adjacent in line sections 22 and 23 of the main supply phase conductor lines $P^1$, $P^2$, and $P^3$ as shown in FIGURE 1 in advance of a line post insulator of either a vertical mounted line post type 24 or a horizontal or other angularly related line post type 25 and embodies an adjustable link generally designated by numeral 26 which adapts the respective line strain insulator mounted disconnect assemblies 21 for full angular adjustment around the axis of its associated conductor lines $P^1$, $P^2$, or $P^3$ so the disconnect D of the respective assemblies 21 can be oriented angularly around the axis of its conductor line into the vertical plane containing its associated conductor line axis. The adjustable link 26 for a particular installation varies according to the relative disposition of the respective conductor line to the line post insulator, a trunnion cross arm type link 27, 27a or 29 as shown in FIGURES 7 through 11 being required where the conductor line continues past the line post insulator as shown in FIGURES 1 and 2, a trunnion type cross arm type link 31 being required in a tap line junction of the type illustrated in FIGURE 3 where alternate input power supply conductors $P^4$ and $P^5$ are provided to energize a power branch line $P^6$ leading to an underground power line (not shown), and a straight link 32, omitting a trunnion cross arm, sufficing in a tap line junction of the type illustrated in FIGURE 6 where an input power supply conductor $P^6$ axially aligned with the axis of the line post insulator is provided to energize a power branch line $P^6$ leading to an underground power line (not shown).

As will be apparent from a consideration of FIGURES 1, 2, and 3 of the drawings, the trunnion cross arm type links 27, 27a, 29, and 31 provide cross arm trunnions 35 to pivotally connect the in line strain insulator mounted disconnect assemblies 21 to line post insulators 24 of the vertically mounted line post type or line post insulators 25 of the vertically mounted line post type so the assemblies will be supported for free bodily pivotal movement only in a vertical plane intersecting the axis of the line post insulator. This pivotal connection prevents bodily rotation of the assemblies 21 around the axis of their respective main conductor lines $P^1$, $P^2$, $P^3$, $P^4$ and $P^5$ thus eliminating torsional stressing of the main conductor lines that might otherwise be imposed by wind pressures acting on the side faces of the disconnects D and any torsional weight components imposed by the lateral offset of the disconnects D and their support brackets 37, 38 with respect to the longitudinal axis of the strain insulators 36, which in each installation of FIGURES 1, 2 and 3 coincide with the axis of the main conductor lines $P^1$, $P^2$, $P^3$, $P^4$, and $P^5$.

Referring for the moment to FIGURES 1 and 2 where links 27 and 29 respectively are employed for connecting to the line post insulators 24 and 25, it will be seen that vertically mounted insulators 24 embody lower end caps 39 having an axially directed threaded mounting post 41 extending downwardly through a horizontally disposed leg 42 of an L-shaped bracket 43 the long leg 44 of which is fixedly bolted to the upper end of post 45 by vertically spaced securing bolt and nut assemblies 46 passing through leg 44 and diametrically through the upper end of post 45. A securing nut and lock washer assembly 47 threaded on the free end of post 41 fixedly secures end cap 39 to leg 42 of bracket 43 to mount insulator 24 in vertically upstanding relation to the upper end of post 45 with its upper end cap 48, provided with laterally spaced, diametrically opposed, upstanding arms 49 (FIGURES 2 and 5) having oppositely aligned stub pivots 51 and 52 adjacent their upper ends. While pivots 51 and 52 may be variously formed, it is preferred that pivot 51 be an integral cylindrical protuberance formed on the inner face of one arm and that pivot 52 comprise the reduced diameter shank end of a headed screw 53 threaded through a tapped aperture in the opposite arm 49 so the reduced diameter end can be axially adjusted toward and away from pivot 51 for a purpose to be presently point out.

The horizontally mounted insulators 25 have pole mounted end caps 39 similar to end caps 39 of insulators 24 the mounting posts 41 of which extend through the medially disposed portion 54 (FIGURE 1) of a U-shaped bracket the respective legs 55 of which terminate in generally right angularly outturned, pole engaging pads 56 adapting the brackets for mounting on diametrically opposite faces of pole 45 as seen in FIGURE 1 by common through bolt and nut assemblies 46. The opposite ends of line insulators 25 are provided with end caps 57 (FIGURE 4) having a centered stub pivot pin 58 and a vertically downwardly spaced T-shaped bracket arm 59 extending generally axially parallel to stub pivot pin 58 and supporting at its free end an upstanding journal post 61 providing a through tapped opening 62 in coaxial aligned relation to stub pivot pin 58. Opening 62 of journal post 61 threadedly receives a headed journal pin or screw 63 having a reduced diameter end 64 disposed in axially aligned, end opposing, spaced relation to stub pivot pin 58. Journal pin or screw 63 is adapted when threaded home into opening 62 to dispose its end 64 to cooperate with stub pivot pin 58 and form opposing journal pivots coaxially aligned with the longitudinal axis of the associated line post insulator 25. Journal pivots 58 and 64 are spaced apart endwise sufficiently to permit them to be entered into the blind journal bores 65 formed in the oppositely directed cross-arm trunnions 35 of links 27, 27a, 29 or 31 when pin or screw 63 is backed out to withdraw journal pivot 64, partially into opening 62 of arm 61.

Trunnion arms 35 of links 27, 27a, and 31 are disposed in diametrically opposing relation to link body 68 with their axis lying in the plane H (FIGURES 7 and 10) containing the longitudinal axis of the link body and the axis of the fixed end pivot journal bore 66. In the use of links 27, 27a and 31 with vertically mounted line post insulators 24 as shown in FIGURES 1 and 2 and horizontally mounted line post insulators 25 as shown in FIGURE 3 the trunnion arm axis is horizontal as is plane H and rotation of the links is confined to a truly vertical plane normal to the trunnion arm axis. Should it be necessary to effect a connection to a line post insulator mounted at an inclination between true vertical and true horizontal, a frequent occurrence since many standard pole mounting brackets provide for 5°, 15°, 30°, 45° and 60° mounting of horizontal line pole insulators to assure a pre-planned spacing of the three phase conductor lines, a link 29 having trunnion arms 35 angularly offset around the longitudinal axis of the link body 68 to establish a trunnion axis angular offset matching the inclination of the line post insulator 25. FIGURE 12 of the drawings illustrates such a link 29 wherein the angle of offset A of the trunnion axis is 60°.

Referring for the moment to FIGURES 7 through 9, trunnion link 27 comprises a main cylindrical body 68 formed at one end with an axially directed, vertically disposed, flat sided, tongue-like, terminal connector 67 having a transverse bore 66 therethrough the axis of which intersects the longitudinal axis of body 68 at right angles, formed at the opposite end with an externally threaded shank portion 69, and formed at a point between terminal connector 67 and shank portion 69 with oppositely directed trunnion arms 35 the axis of which parallels the axis of bore 66 and intersects the longitudinal axis of body 68. Shank portion 69 threadedly receives a lock nut 71 and the internally threaded hub portion 72 of a clevis type connector member 73 the spaced arms 74 of which are provided with through bores 75 journalling a headed pivot pin 76 removably secured in place by a cotter pin 77 in well known manner. In normal use trunion link 27 will be assembled to a pole mounted line post insulator 24 or 25 by telescoping a cross-arm trunnion journal bore 65 over fixed stub pivot 51 or 58 and then threading headed journal pin or screw 53 or 63 home while guiding reduced diameter stub pivot 52 or 64 into the trunnion journal bore 65 of the oppositely directed trunnion arm 35. When threaded home journal pin or screw 53, 63 will lockingly engage its lock washer 78 to fixedly position its stub pivot 52 or 64 in predetermined spaced relation to its opposing stub pivot 51, 58 to journal link 26 for pivotal movement only around the horizontally disposed stub pivots 51–52 or 58–64 with its opposite ends moving up and down at opposite sides of the pivot axis of the associated line post insulator stub pivots in a vertical plane containing the longitudinal axis of link body 68 due to the horizontal stub pivots employed.

The strain clamp 79 fixed to conductor line section 23 inwardly from its free end (see FIGURES 1 and 2) and having a clevis formation 81 is coupled to link 27 by entering tongue 67 of link 27 into clevis 81 to align the mating journal bores with bore 66 and inserting pivot pin 81 (FIGURE 2) through the aligned journal bores to pivotally join the fixed link end connector 7 to strain clamp 79. This fixed the free end of conductor line section 23 adjacent the line post insulator for ready connection to the support bracket 38 of the strain insulator supported disconnect D which will now be described in detail.

Referring for the moment to FIGURE 2, each strain insulator disconnect assembly includes a strain insulator 36 having end caps 83 at its opposite ends providing axially directed, tongue-like connectors 84 disposed in a common plane containing the longitudinal axis of insulator 36 and mounting in any suitable manner respective disconnect support brackets 37 and 38 having arms 85 and 86 preferably centered with respect to the aforesaid common plane and extending radially beyond the insulator skirts at one side. Each end cap connector is provided with a through journal bore (not shown) disposed at right angles to the aforesaid common plane to receive a pivot pin 76 pivotally connecting the respective ends of strain insulator 36 between the opposing arms of clevises 73 of links 27, 31 or 32, or in the arrangement of FIGURE 6, the clevis formation 81 of strain clamp 79. Bracket arms 85 and 86 are of conventional construction providing respectively a disconnect hinge mount and hinge contact and a fixed contact and latching mechanism to receive and support the free end of disconnect D when in circuit closing position. Brackets 37 and 38 are also provided in conventional fashion with line clamp means 87 for connection to the free ends 88, 89 of conductor line sections 22 and 23.

In effecting an installation in the field, as illustrated in FIGURES 1 and 2, the linemen first connect a strain clamp 79 inwardly of the free end of one of the conductor line sections, section 23 as illustrated in the drawings, and then raise the strain clamp 79 with line section 23 attached into position and insert tongue-like connector 67 of the already mounted trunnion link 27 (FIGURES 1 and 2) or 29 (FIGURE 12) into clevis 81 of strain clamp 79 and pivotally join the two by insertion of pivot pin 82 while maintaining the required tension on line section 23. They then raise the strain insulator 36, with its brackets 37 and 38 installed and pointing downwardly, into position and insert the tongue-like connector 84 adjacent bracket 38 into clevis 73 of the already mounted trunnion link 27 or 29 and pivotally join the two by insertion of pivot pin 76. In the case of the double strain insulator disconnect assembly of FIGURE 3, each strain insulator is connected first to its strain clamp 79 through a respective link 32 and then independently to the clevis 73 at the opposite ends of link 31. In all resulting installations the strain insulator 36 may be swung into depending relation from pin 76 so that a lineman can, from a position facing the clevis end of the link 27, 29 or 31, readily sight check the vertical dependency of strain insulator 36 using a spirit level, plumb line, or other instrument. If this sight check shows the insulator to be hanging off vertical, the lock nut 71 securing clevis 73 against rotation may readily be loosened freeing the clevis so the free hanging weight of strain insulator 36 and its attached brackets 37 and 38 may swing the clevis into true vertical relation to the longitudinal axis of link 27, 29 or 31. Tightening of lock nut 71 will then fix clevis 73 and strain insulator 36 in proper angular orientation and initial connection to the other conductor line section 22 in the FIGURE 1 and 2 assemblies is effected by connecting a strain clamp 79 inwardly of the free end of conductor line section 22, inserting the tongue-like connector 67 of a straight extension link 32 into the clevis 81 of strain clamp 79, pivotally joining the two by insertion of pivot pin 82, raising extension link 32 with strain clamp 79 and conductor line section 22 attached into position and inserting tongue-like connector 84 adjacent bracket 37 into clevis 73 of extension link 32 and pivotally joining the two by insertion of pivot pin 76 while maintaining the required tension on line section 22. A further sight test, as outlined above, can then be made to check the vertical dependency of brackets 37 and 38 and the free ends 88 and 89 of the respective conductor line sections 22 and 23 may be connected to the line clamp means 87 of brackets 37 and 38 to complete the normal circuit connection to the disconnect contacts provided by each bracket.

At this time the assembly may be hand tested to check the confining rotational control provided by the trunnion link and the appropriate disconnect D may be installed on bracket 37 for pivotal movement and hand operated and sight tested to make sure that true vertical plane opening and closing movement is provided. Should it be found that the intended vertical planar operation is not provided, the linemen need only loosen the clamp nut 71 securing the clevis 73 of the trunnion link 27, 29 or 31 as the case may be and manually rotate insulator 36 and its attached disconnect D around the axis of conductor line section 22 an amount sufficient only to position the bracket arms 85 and 86 in true vertical dependent position or, if it is found that the vertical misalignment has occurred because of torsional or twist forces built up in the conductor line section 22, rotation of as much as one full turn in the appropriate direction without disconnecting the line clamp means 87 to relieve the torsional force and position bracket arms 85 and 86 in proper position. If more than one full turn is needed, the line clamp means 87 of bracket 38 may be disconnected to permit whatever rotation may be required.

DESCRIPTION OF ALTERNATE EMBODIMENT

In a tap line junction like that illustrated in FIGURE 6, the line pole insulator 91 comprising a single disc insulator having oppositely directed clevis type end caps 92 and 93 is secured to post 45 by means of a nut and bolt assembly 94 having a tongue-like connector head 96 mounting a pivot pin 97 the opposite ends of which journal the space arms of clevis type end cap 92 for swiveling movement of line post insulator in a vertical plane relative to post 45. The oppositely directed end cap 93 journals the tongue-like connector 67 of a straight type strain extension link 32 for vertical planar movement around the axis of connecting pivot pin 81 and disposes the opposite link end carrying angularly adjustable clevis 73 and lock nut 71 for receiving end cap connector 84 adjacent bracket 38 of strain insulator 36.

This installation is effected in much the same fashion as those previously described, link 32 being first connected to line post insulator 91 and then connected through clevis 73 and pivot pin 76 to connector 84 of strain insulator 36 fitted with its brackets 37 and 38 disposed in dependent relation. Here again the strain insulator 36 may be swung downwardly to assume a substantially dependent relation to its pivot pin 76 to permit initial sight checking of the vertical dependency of strain insulator 36 and, upon connection of clevis 81 of strain clamp 79 carrying conductor line section 22 directly to the other end cap connector 84, the vertical dependency of brackets 37 and 38 can be sight tested as previously described before the final connection of the free end of conductor line section 22 and the ground lead P⁶ and hand testing of the operating movement of the disconnect D.

DESCRIPTION OF ALTERNATE
TRUNNION LINK

In lieu of the angularly adjustable clevis type connector member 73, the present invention contemplates fitting extension links 26, identical in all other respects to links 27, 29, 31, or 32, with an angularly adjustable tongue-like connector member 98. Such a link designated 27a is shown in FIGURES 9 and 10 where it can be seen that connector member 98 comprises a thickened nut portion 99 integrally formed with or welded to the ends of laterally spaced legs 101 extending from one edge of a flat sided body 102 having a through aperture 103 therein to receive a pivot pin 76, like that previously described, for pivotally supporting the threaded end of link 27a between clevis type connectors (not shown) with which some strain insulators are provided.

The invention may be embodied in other specific forms without departing from the spirit or essential characteristics thereof. The present embodiments are therefore to be considered in all respects as illustrative and not restrictive.

What is claimed and desired to be secured by Letters Patent is:

1. In an electrical supply line transmission system an in line disconnect assembly comprising a strain insulator interposed between aligned conductor line sections and having opposite end bracket means for mounting in side spanning relation a conductor line disconnect and means for pivotally connecting said insulator to a line post insulator for rotation solely in a vertical plane, said means comprising an extension link providing a fixed line post insulator pivot connection spaced from one end which threadedly mounts a strain insulator pivot connection member and a clamp nut adapted to lock said pivot connection member in any selected angular relation to said fixed pivot connection adapting said strain insulator and its supported line disconnect for angular adjustment around the axis of said conductor line sections upon loosening said clamp nut to thereby relieve any undesired twist in said conductor line sections and permit the side spanning conductor line disconnect to be positioned in a preselected desired angular relation around the common axis of said conductor line sections to assure positioning of said disconnect for free opening and closing movement.

2. The combination of claim 1 wherein said fixed line post insulator pivot connection comprises a tongue-like formation at the other end of said extension link having a transverse through bore.

3. The combination of claim 1 wherein said fixed line post insulator pivot connection comprises oppositely directed trunnion arms disposed between the link ends and the other link end comprises a tongue-like formation having a transverse through bore adapting said link end for connection to a strain clamp fixed to one of said conductor line sections, said trunnion arms defining a pivot axis offset with respect to the axis of said through bore to match the axis of rotation of said extension link relative to said line post insulator to the inclination of the line post insulator to said vertical plane of rotation.

4. The combination of claim 3 wherein said line post insulator includes trunnion arm support means arranged to define a pivot axis in a plane containing the longitudinal axis of the line post insulator and said turnnion arms define a pivot axis intersecting the longitudinal centerline of said extension link at right angles.

5. The combination of claim 3 wherein the line post insulator is mounted to dispose its axis at an inclination between vertical and horizontal, and said trunnion arms of said extension link are angularly offset with respect to the axis of said tongue-like pivot connection around the longitudinal axis of the extension link to match the inclination of the line post insulator axis thereby adapting said extension link for movement in said vertical plane which intersects the longitudinal axis of the line post insulator to define an included angle of less than 90°.

6. The combination of claim 2 wherein said trunnion arm support means comprises opposing journal pin formations mounted in axially spaced relation to the clamp top and said trunnion arms are provided with oppositely directed end opening journal bores for receiving said journal pin formations.

7. The combination of claim 1 wherein said line post insulator includes a clamp top providing axially protruding pivot connection means for directly receiving said fixed line post pivot connection.

8. In an electrical supply line transmission system an in line strain insulator supported disconnect assembly comprisnig a line post insulator and an extension link for connecting the disconnect assembly thereto for swivelling movement solely in a vertical plane comprising a rod-like link having at least one threaded end, a pivot connector threadedly mounted on said one end for angular adjustment around the longitudinal axis of said link adapting said link for connection to the strain insulator supporting said disconnect assembly, and pivot means spaced along said link from said one end and fixedly angularly related to the longitudinal axis of said link to establish a pivotal connection for connecting said link to said line post insulator that will assure swivelling movement of the link axis in a vertical plane, said adjustable pivot connector being operable to orient its pivot axis to a preselected desired angular relation to said vertical plane to assure positioning of said disconnect for free opening and closing movement.

9. The extension link of claim 8 wherein said pivot means comprises an integral end formation at the other end of said link defining a pivot axis normal to a vertical plane containing the longitudinal axis of said link and adapting said link for coaxial end connection to a horizontal line post insulator.

10. The extension link of claim 8 wherein said pivot means comprises diametrically oppositely directed trunnion arms disposed between the opposite ends of said link and the opposite link end is provided with an integral end formation defining a pivot axis angularly offset around the longitudinal axis of said link with respect to said trunnion arms at a pre-selected angle between 0° and 90° adapting said link for transverse connection to vertical line post insulators and horizontal line post insulators variously inclined at opposite sides of a line post.

References Cited

UNITED STATES PATENTS 2,783,322   2/1957   Samuel et al. _____ 200—47

FOREIGN PATENTS 272,897   5/1928   Great Britain.

ROBERT K. SCHAEFER, Primary Examiner

H. J. HOHAUSER, Assistant Examiner

U.S. Cl. X.R.

174—161; 337—240

PO-1050
(5/69)

UNITED STATES PATENT OFFICE
CERTIFICATE OF CORRECTION

Patent No. 3,480,747      Dated November 25, 1969

Inventor(s)    WILLIAM A. LANKFORD

It is certified that error appears in the above-identified patent and that said Letters Patent are hereby corrected as shown below:

Column 5, line 66, change "81" to --82--.

Column 5, line 67, change "7" to --67--.

Column 5, line 68, change "fixed" to --fixes--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents